(12) United States Patent
Inskeep et al.

(10) Patent No.: US 8,266,441 B2
(45) Date of Patent: Sep. 11, 2012

(54) ONE-TIME PASSWORD CREDIT/DEBIT CARD

(75) Inventors: Todd Keith Inskeep, Charlotte, NC (US); Richard Wade Phillips, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 1160 days.

(21) Appl. No.: 10/907,961

(22) Filed: Apr. 22, 2005

(65) Prior Publication Data

US 2006/0242698 A1 Oct. 26, 2006

(51) Int. Cl.
*G06F 12/14* (2006.01)
*H04L 9/10* (2006.01)

(52) U.S. Cl. .......................................... 713/185; 726/20
(58) Field of Classification Search .................. 713/172, 713/179, 182–186, 193–194
See application file for complete search history.

(56) References Cited

U.S. PATENT DOCUMENTS

| | | |
|---|---|---|
| 4,720,860 A | 1/1988 | Weiss |
| 4,800,590 A | 1/1989 | Vaughan |
| 4,819,267 A | 4/1989 | Cargile et al. |
| 5,060,263 A | 10/1991 | Bosen et al. |
| 5,168,520 A | 12/1992 | Weiss |
| 5,182,767 A | 1/1993 | Bernard |
| 5,216,716 A | 6/1993 | Bernard |
| 5,361,062 A | 11/1994 | Weiss et al. |
| 5,432,851 A | 7/1995 | Scheidt et al. |
| 5,577,121 A | 11/1996 | Davis et al. |
| 5,592,553 A | 1/1997 | Guski et al. |
| 5,627,355 A * | 5/1997 | Rahman et al. ............... 235/379 |
| 5,638,444 A | 6/1997 | Chou et al. |
| 5,657,388 A | 8/1997 | Weiss |
| 5,661,807 A | 8/1997 | Guski et al. |
| 5,859,913 A | 1/1999 | Goreta et al. |
| 5,887,065 A | 3/1999 | Audebert |
| 5,937,068 A | 8/1999 | Audebert |
| 5,963,643 A | 10/1999 | Goreta et al. |
| 6,067,621 A * | 5/2000 | Yu et al. ........................ 713/172 |
| 6,163,771 A | 12/2000 | Walker et al. |

(Continued)

FOREIGN PATENT DOCUMENTS

EP 1338940 8/2003

(Continued)

OTHER PUBLICATIONS

On-Line E-Wallet System with Decentralized Credential Keepers. Mobile Networks and Applications 8[online].The Netherlands:Kluwer Academic Publishers, 2003[retrieved on Apr. 27, 2008]. pp. 87-99.*

(Continued)

*Primary Examiner* — Venkat Perungavoor
(74) *Attorney, Agent, or Firm* — Moore & Van Allen PLLC; W. Kevin Ransom

(57) ABSTRACT

A one-time password (OTP) generator in combination with a conventional credit/debit card comprising a card having a magnetic bar stripe, raised imprint card numbers and name, expiration date and four digit code as are known in the art is provided. Full smart card functionality may also be provided. The card also includes a microprocessor and software, dedicated chip or a memory chip for generating the OTP. A visual and/or audio display is provided on the card to output the OTP to the user. The end user inputs the OTP to access the secured system. The credit/debit card functionality may be used apart from the OTP generator functionality.

32 Claims, 4 Drawing Sheets

U.S. PATENT DOCUMENTS

| | | | |
|---|---|---|---|
| 6,445,780 B1 | 9/2002 | Rosset et al. | |
| 6,609,654 B1* | 8/2003 | Anderson et al. | 235/379 |
| 6,628,198 B2 | 9/2003 | Fieschi et al. | |
| 6,641,050 B2 | 11/2003 | Kelley et al. | |
| 6,704,715 B1 | 3/2004 | Rosset et al. | |
| 6,715,082 B1 | 3/2004 | Chang et al. | |
| 6,902,116 B2 | 6/2005 | Finkelstein | |
| 6,928,558 B1 | 8/2005 | Allahwerdi et al. | |
| 6,952,781 B1 | 10/2005 | Chang et al. | |
| 6,957,185 B1* | 10/2005 | Labaton | 704/500 |
| 7,003,501 B2 | 2/2006 | Ostroff | |
| 2001/0054148 A1 | 12/2001 | Hoornaert et al. | |
| 2001/0056409 A1 | 12/2001 | Bellovin et al. | |
| 2002/0096570 A1* | 7/2002 | Wong et al. | 235/494 |
| 2002/0116617 A1 | 8/2002 | Talton, Sr. | |
| 2002/0133713 A1 | 9/2002 | Fieschi et al. | |
| 2002/0198848 A1 | 12/2002 | Michener | |
| 2003/0011731 A1 | 1/2003 | Yoshida et al. | |
| 2003/0046551 A1 | 3/2003 | Brennan | |
| 2003/0084304 A1 | 5/2003 | Hon et al. | |
| 2003/0126094 A1 | 7/2003 | Fisher et al. | |
| 2003/0135739 A1 | 7/2003 | Talton, Sr. | |
| 2003/0182241 A1 | 9/2003 | Everhart | |
| 2003/0204732 A1 | 10/2003 | Audebert et al. | |
| 2003/0208449 A1 | 11/2003 | Diao | |
| 2003/0212894 A1* | 11/2003 | Buck et al. | 713/184 |
| 2004/0026495 A1 | 2/2004 | Finkelstein | |
| 2004/0026506 A1 | 2/2004 | Finkelstein | |
| 2004/0031856 A1 | 2/2004 | Atsmon et al. | |
| 2004/0059952 A1 | 3/2004 | Newport et al. | |
| 2004/0064706 A1 | 4/2004 | Lin et al. | |
| 2004/0202325 A1 | 10/2004 | Margalit et al. | |
| 2004/0255119 A1 | 12/2004 | Ukeda et al. | |
| 2005/0015588 A1 | 1/2005 | Lin et al. | |
| 2005/0043997 A1 | 2/2005 | Sahota et al. | |
| 2005/0050330 A1* | 3/2005 | Agam et al. | 713/172 |
| 2005/0067485 A1 | 3/2005 | Caron | |
| 2005/0069137 A1 | 3/2005 | Landrock | |
| 2005/0166263 A1 | 7/2005 | Nanopoulos et al. | |
| 2005/0182927 A1* | 8/2005 | Shatford | 713/159 |
| 2005/0182971 A1* | 8/2005 | Ong et al. | 713/202 |
| 2005/0188202 A1 | 8/2005 | Popp | |
| 2005/0239440 A1* | 10/2005 | Chen et al. | 455/411 |
| 2005/0240528 A1* | 10/2005 | Hendrick | 705/44 |
| 2005/0269402 A1* | 12/2005 | Spitzer et al. | 235/380 |
| 2006/0015358 A1 | 1/2006 | Chua | |
| 2006/0059346 A1 | 3/2006 | Sherman et al. | |
| 2006/0174113 A1* | 8/2006 | Zahari | 713/168 |
| 2007/0136211 A1 | 6/2007 | Brown et al. | |
| 2008/0029607 A1 | 2/2008 | Mullen | |

FOREIGN PATENT DOCUMENTS

| | | |
|---|---|---|
| EP | 1378870 | 1/2004 |
| GB | 2387999 A | 10/2003 |
| WO | 00/48064 | 8/2000 |
| WO | 0163515 A1 | 8/2001 |
| WO | 0167355 A2 | 9/2001 |

OTHER PUBLICATIONS

Pocket device for authentication and data integrity on Internet banking applications. IEEE 0-7802-7882-2/03[online], [retrieved on Apr. 25, 2008]. pp. 43-50.*

Bank of America Corporation et al., "International Preliminary Report on Patentability," Jul. 3, 2007.

PCT International Search Report for corresponding PCT Application No. PCT/US2006/015218 dated Aug. 22, 2006.

PCT Written Opinion of the International Searching Authority for corresponding PCT Application No. PCT/US2006/015218 dated Aug. 22, 2006.

European Patent Office, Examination Report, Apr. 29, 2010, 5 pgs.

Chinese Patent Office; Second Office Action; Jul. 12, 2010; issued in Chinese Patent Application No. 200680022761.0.

Database Inspec [Online], The Institution of Electrical Engineers, Stevenage, GB; Feb. 14, 2007, Molloy I et al.: "Dynamic Virtual Credit Card Numbers", XP002480516, Database accession No. 972118, the whole document.

Bank of America Corporation, PCT International Search Report, issued in corresponding International Patent Application No. PCT/US2007*084529, Jun. 4, 2008.

Bank of America Corporation, PCT Written Opinion, issued in corresponding International Patent Application No. PCT/US2007*084529, Jun. 4, 2008.

European Patent Office, Examination Report, Mar. 4, 2008, issued in European Patent Application No. 06758494.6.

Mexican Patent Office, Office Action, May 5, 2010, issued in Mexican Patent Application No. MX/a/2007/013218.

Chinese Patent Office; First Office Action; Nov. 6, 2008; issued in Chinese Patent Application No. 200680022761.0.

International Preliminary Report on Patentability and Written Opinion of the International Searching Authority mailed May 28, 2009 for International Application No. PCT/US2007/084529.

Examination Report issued by the European Patent Office for related European Patent Application No. 06758494.6 mailed Apr. 29, 2010.

Extended search report issued by the European Patent Office for related European Patent Application No. 10012051.8 dated May 24, 2011.

Office Action Issued by the Mexican Patent Office for Mexican Patent Application No. MX/a/013218, dated Aug. 8, 2011.

* cited by examiner

ONE-TIME PASSWORD CREDIT/DEBIT CARD

BACKGROUND

The invention relates generally to security authentication systems and more particularly to a combination one-time password generator and credit/debit card.

Methods and apparatuses for authenticating users to control access to secured systems are well known. One such authentication system assigns a user ID and a user password to a user. When the user desires access to the secured system, the user inputs the ID and password to a system authentication node. The authentication node confirms that the input user ID and password correspond to the stored user ID and password and enables user access to the system. While such static security systems are widely used, they are subject to security breaches caused in part by the static nature of the user ID and password. Because these security codes do not change frequently over time they are susceptible to being discovered through unauthorized means. Once a User ID and password are discovered by an unauthorized individual, the system security is compromised and the system is susceptible to unauthorized access. Such security breaches are a concern for all secured systems including financial systems where unauthorized access may compromise confidential information and/or result in asset misappropriation. Thus, security authentication systems are continuously upgraded in order to prevent such security breaches.

One such enhanced security technology is known as one-time password (OTP) authentication. OTP authentication uses a password that is transitory and only valid for a single use such that once used, the OTP is not valid for later access. The OTP may be time-based or event-based. Thus, even if the OTP is obtained by unauthorized means, the possibility that it can be used to gain access to the system is very limited. OTP authentication systems generate the OTP as a function of secret information such as a user password or encryption key, time dependent information such as time of day or time/date and non-secret information such as user ID. The OTP is generated by a token possessed by the user and is input to an authentication node. The input OTP is compared to an OTP generated at the authentication node using the same information and encryption algorithm. If the input OTP matches the OTP generated at the authentication node, the user is allowed access to the system.

One problem with existing systems is that the user tokens for generating the OTP are bulky, single function, stand alone devices that must be available to the end user every time the user wants to access the secured system. Because the token must be readily available to the individual, the token must be carried by the individual in addition to other personal effects such as keys, credit cards and the like. People are resistant to carrying the OTP tokens because of the inconvenience of having to carry a separate, bulky single-function device. As a result, wide spread adoption of OTP for authentication has been slow.

Thus, an improved OTP generator for user authentication is desired.

SUMMARY OF THE INVENTION

The invention comprises an OTP generator in combination with a conventional credit/debit card. Specifically, one embodiment of the invention comprises a credit/debit card having a magnetic bar stripe, raised imprint card numbers and name, expiration date and four digit PIN code as are known in the art. The card also includes a microprocessor and software, dedicated chip or a memory chip for generating the OTP. The OTP can be generated using existing algorithms. A visual and/or audio display is provided on the card to output the OTP to the user. The end user inputs the OTP to access the system on-line, telephonically or otherwise. The credit/debit card functionality can be used apart from its use as an OTP generator. By combining the OTP token and a credit/debit card, the OTP generator can be conveniently carried without increasing the number of personal effects carried by the user. By making access to the OTP generator more convenient, the acceptance of OTP technology will increase and security will be enhanced. Additionally, the OTP could be combined with the existing credit/debit card PIN (used for ATM's and point of sale terminals) to increase the security associated with these transactions.

DETAILED DESCRIPTION OF EMBODIMENTS OF THE INVENTION

Figure 1:
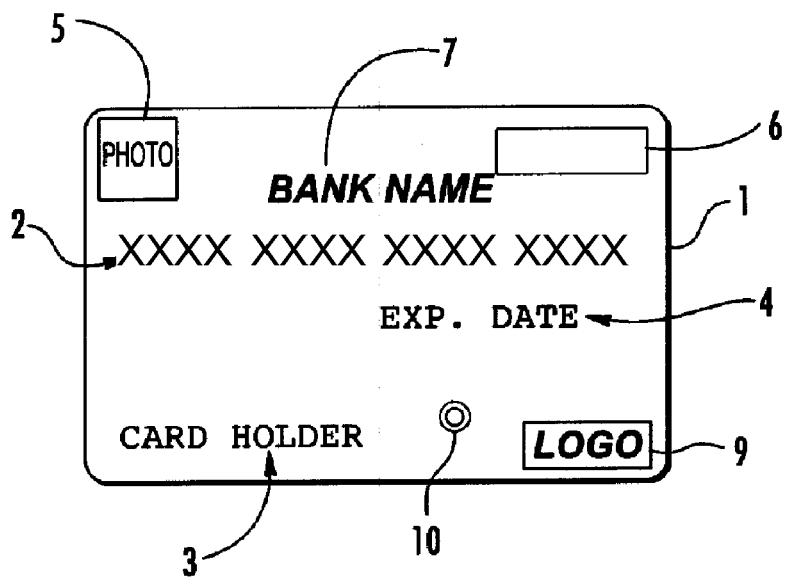
FIG. 1 is a front view showing an embodiment of the OTP credit/debit card of the invention.
Figure 2:
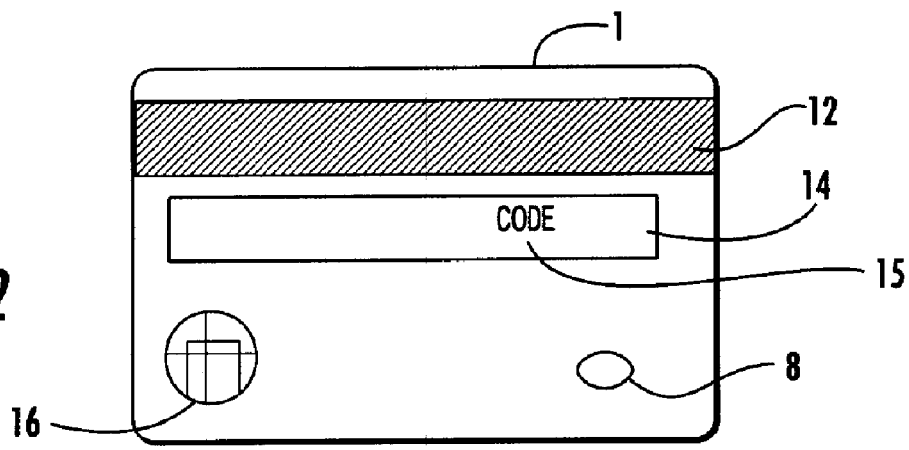
FIG. 2 is a back view showing an embodiment of the OTP credit/debit card of the invention.

Referring to FIG. 1 the OTP credit/debit card of the invention comprises a plastic card 1 having the size and shape of a conventional credit card. Conventional credit/debit cards are approximately 3⅜ inches×2⅛ inches×⅛ of an inch. Smaller credit cards are also known. One such card is the MINI-CARD that is approximately 2½ inches×1½ inches×⅛ of an inch and is distributed by Bank of America. The card of the invention may be provided in any conventional credit card size. The card may be provided with raised card numbers 2, card holder name 3, expiration date 4 and card holder photograph and/or hologram 5 as is known in the art. The card 1 also may include issuer information such as bank name 7 and logo 9. A display 6 is provided for visually displaying the OTP generated by card 1. Also located on card 1 is an initiation button 10 that is depressed by the user to initiate the generation of the OTP. Referring to FIG. 2 the back of card 1 is shown and may include a magnetic stripe 12 coded with information about the card as is known in the art and a signature block 14. An authentication code 15 may be provided consisting of a three or four digit code. A speaker 8 may also be provided for generating an audio signal of the OTP. A standard smart card contact interface 16 may also be provided. Smart card interface 16 may be located on the front of card 1 instead of on the back of the card as shown.

Figure 3:
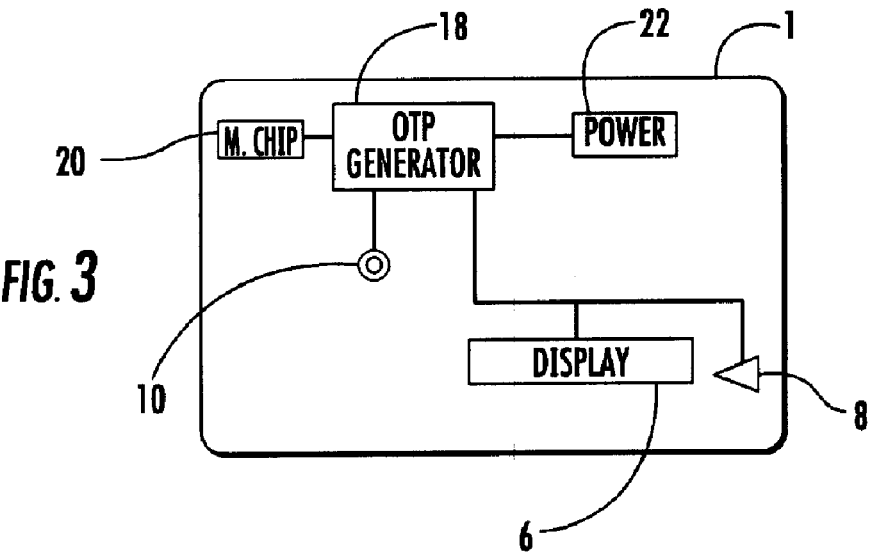
FIG. 3 is a functional block diagram showing an embodiment of the OTP credit/debit card of the invention.

Referring to FIG. 3 card 1 includes an OTP generator 18 that includes internal memory or memory could be provided on a separate memory chip 20. Where memory is provided on the OTP generator 18, the separate memory chip 20 may be omitted. The OTP generator 18 used in the card of the invention may comprise the microprocessor used in the standard smart card. The industry ISO 7816 international standard defines the design parameters of the smart card. Smarts cards may have up to 1 kilobyte of RAM, 24 kilobytes of ROM, 16 kilobytes of programmable ROM, and an 8-bit microprocessor running at 5 MHz. In place of the general purpose processor OTP generator 18 may comprise a dedicated integrated chip, memory chip or other processing technology. If the OTP credit/debit card is provided with full smart card functionality, a single processor may be used to generate the OTP and provide the smart card functionality.

Smart cards require a power source and a mechanism to communicate with a smart card reader. Some smart cards have contact pads such as gold plates 16 at one corner of the card. This type of smart card is known as a contact smart card. The plates 16 are used to supply the necessary energy to the card and to communicate via direct electrical contact with the smart card reader. For some smart cards the connection between the reader and the card is done via radio frequency (RF). The cards have a small wire loop embedded inside that is used as an inductor to supply the energy to the card and communicate with the reader. When a card is inserted into the card readers RF field, an induced current is created in the wire loop and used as an energy source. The standards relating to smart card interfaces are ISO 14443 and ISO 15693 for contactless cards. EMV 2000 version 4.0, published December 2000, define specifications to allow interoperability between smart cards and smart card readers on a global basis.

The card of the invention could include either contact, RF connections or both; however, because the OTP functionality in the card of the invention is intended to be used separate from the smart card functionality, a power source 22 is provided on the card 1. Power source 22 may comprise a built in battery cell of the miniature button type.

The card 1 uses an authentication device or devices and functionality that enable the card to function as a conventional credit/debit card. The authentication device may comprise the magnetic stripe, signature block, authentication code, card number and expiration date, photo and/or other security devices as are known in the art. Moreover, the authentication device and functionality may comprise full smart card functionality where the smart card microprocessor communicates with the card reader as previously described to authenticate the card as is known in the art.

Figure 4:
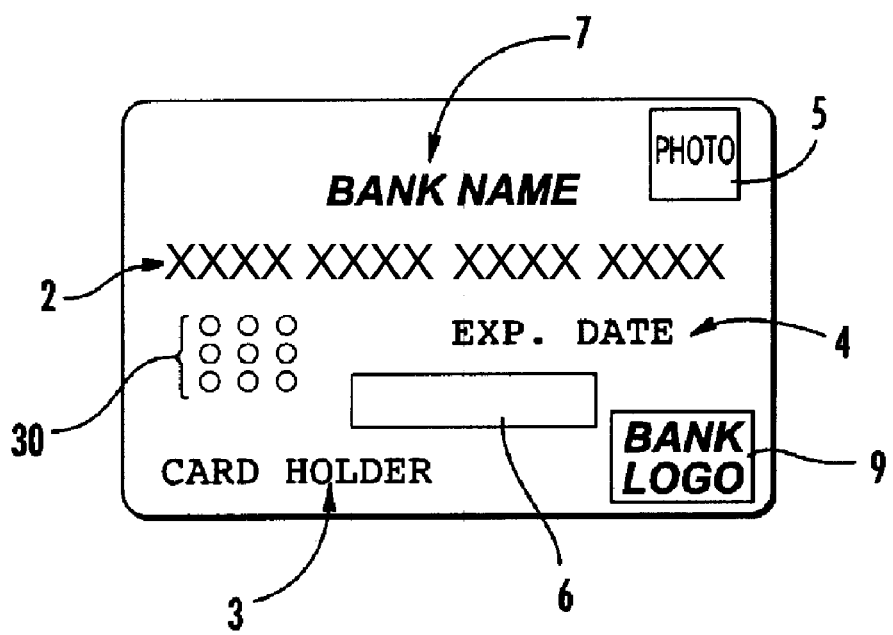
FIG. 4 is a front view showing an alternative embodiment of the OTP credit/debit card of the invention.

In order to generate the OTP the Hashed Message Authentication Code (HMAC) One-Time Password Algorithm (HTOP) may be used. OTP algorithms are well known and are commercially available. One such HTOP algorithm is proposed by the Open Authentication group (OATH) and provided by VERISIGN, INC. A time/clock-based algorithm such as RSASecurity Inc.'s SecureID algorithm could also be used. Other suitable OTP algorithms may also be used. The algorithm is stored in memory 20 or in the OTP generator 18. OTP generator 18 generates the OTP when the system is initiated by the user by depressing button 10. Button 10 may consist of a film capacitance button. A third type of OTP algorithm is based on a challenge issued by the system. The challenge is entered into the card 1 and the OTP algorithm generates the OTP based on the challenge. A challenge based algorithm requires a complement of buttons 30 to provide the alpha-numeric input as shown in FIG. 4. Like reference numerals are used in FIG. 4 to reference like elements previously described with reference to FIG. 1. Buttons 30 may consist of a film capacitance buttons.

In order to display the OTP output by OTP generator 18, visual display 6 is provided on card 1. Display 6 may comprise an Organic LED, electroluminescence display, liquid crystal display or other suitable thin, low power display. In addition to or as an alternative to the visual display an audio output via speaker 8 may be provided. Audio output on credit/debit cards is commercially available from AUDIO SMART CARD SA or BEEPCARD INC. The audio output is commonly used in conjunction with a tone reader that recognizes the audio tone output by the card. For example, the user can initiate the OTP functionality and hold the card speaker 8 to the mouthpiece of a telephone to log onto a secured system telephonically. If full smart card functionality is provided the OTP may be input via a smart card reader. Alternatively, a digital certificate and private key stored on the card could be used via a secured sockets layer (SSL) to perform mutual authentication of the card and the web site, as is known, where the user enters the OTP and a PIN to complete the authorization process.

Figure 5:
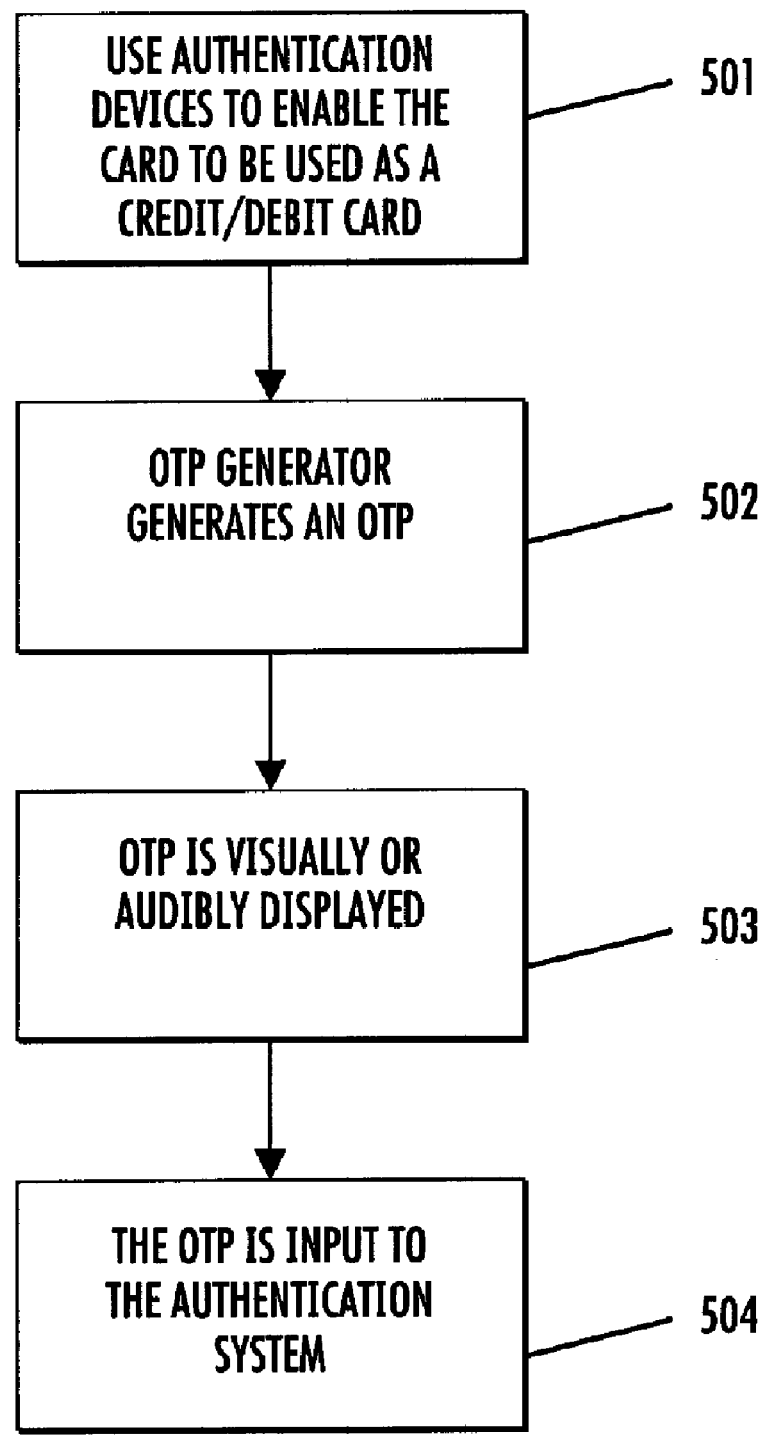
FIG. 5 is a block diagram showing a method of using the OTP credit/debit card of the invention.

Referring to FIG. 5, the card 1 of the invention can function as a credit/debit card and includes one or more authentication devices, as previously described, that allow the card to be used as a credit/debit card (block 501). Card 1 may also be provided with full smart card functionality. In addition to the debit/credit card functionality, card 1 also functions as an OTP generator. When the user depresses button 10, OTP generator 18 utilizes an OTP algorithm to generate an OTP (block 502). The OTP is visually displayed on display 6 or audibly developed at speaker 8 (block 503). The user inputs the OTP to the authentication system where it is authenticated to allow the user to access secure system resources (block 504). The user may input the OTP by entering the OTP on-line at for example a personal computer or by orally presenting the OTP over a voice system such as by telephone, or otherwise. The combination of the credit/debit card with the OTP functionality eliminates the need for the user to carry a separate OTP token and will make the use of OTP technology more widely acceptable.

Figure 6:
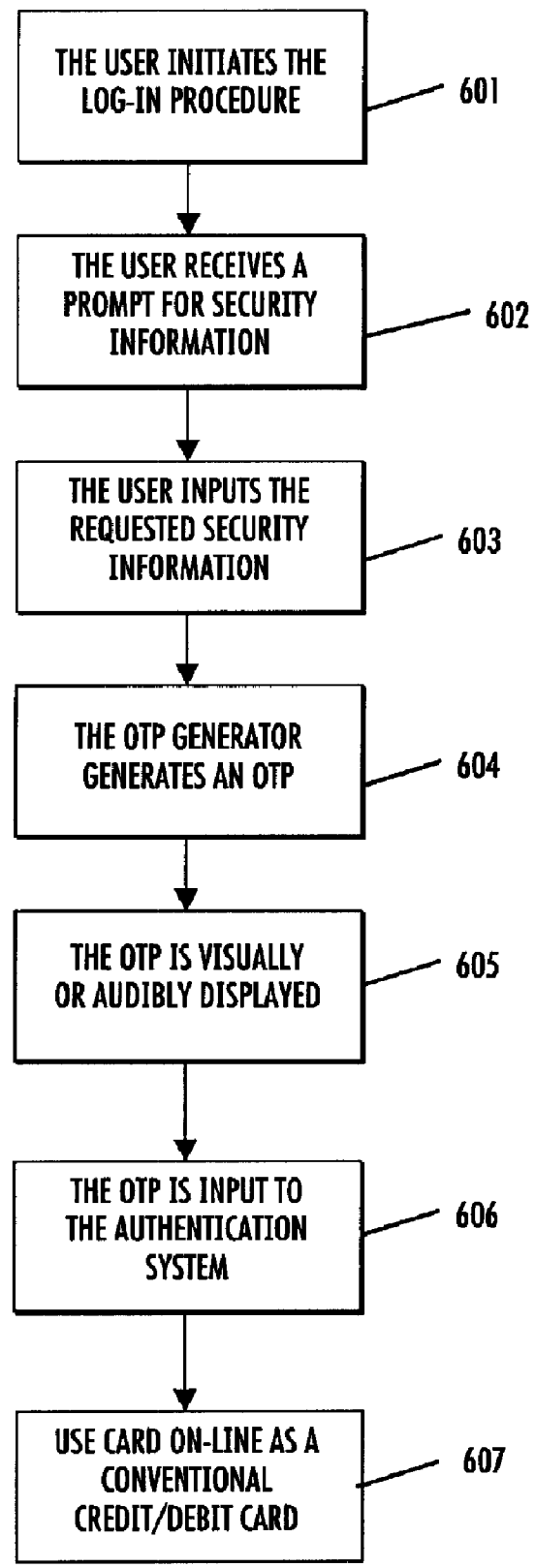
FIG. 6 is a block diagram showing another method of using the OTP credit/debit card of the invention.

Referring to FIG. 6, the card 1 of the invention is particularly well suited for on-line banking and on-line purchase transactions. The user initiates the log-in procedure such as by accessing an on-line banking log-in page or clicking on an on-line purchase request (block 601). The user is prompted for security information such as user name, PIN code, password or the like to authenticate the user (block 602). The user inputs the requested security information (block 603). The system requests the OTP. The user depresses button 10 and the OTP generator 18 utilizes an OTP algorithm to generate an OTP (block 604). The OTP is visually displayed on display 6 or audibly developed at speaker 8 (block 605). The user inputs the OTP to the authentication system where it is authenticated to verify that the user is in possession of the card (card present transaction) to allow the user to access secure system resources (block 606). The user may input the OTP by entering the OTP on-line at for example a personal computer. The user can then perform secured on-line banking functions or make an on-line purchase using card 1 as a conventional credit/debit card (block 607). The combination of the credit/debit card with the OTP functionality eliminates the need for the user to carry a separate OTP token and will make the use of OTP technology more widely acceptable.

Additionally, for a card version employing smart card technology, the OTP capability may be accessed via an application programming interface or API and the smart card interface 16. In this configuration, a card reader would be employed to provide the electrical interface to the card. Authentication via the card interface 16 could be used for both online banking or other online authentication or to enable credit/debit card functionality.

While embodiments of the invention are disclosed herein, various changes and modifications can be made without departing from the spirit and scope of the invention. The scope of the invention is indicated in the appended claims, and all changes that come within the meaning and range of equivalents are intended to be embraced therein.

What is claimed is:

1. A credit/debit card comprising:
one or more input devices positioned on the credit/debit card and configured to enable a user of the credit/debit card to input information into the credit/debit card including a challenge response, wherein the one or more input devices comprises a plurality of buttons corresponding to a plurality of characters, wherein a challenge response comprises a plurality of characters, and wherein a challenge response may be input into the credit/debit card using the plurality of buttons;
a processor in communication with the one or more input devices, wherein said processor is configured to determine whether an input challenge response is successful;
a one-time password generator configured to generate a one-time password based at least partially on the challenge response input by the user into the credit/debit card;
a display for displaying the one-time password;
a power source; and
an authentication device allowing the credit/debit card to be used for performing credit/debit transactions.

2. The credit/debit card of claim 1 wherein audio signals representing the one-time password are generated.

3. The credit/debit card of claim 1, wherein the authentication device comprises a processor for storing information and a member for transmitting the information.

4. The credit/debit card of claim 1, further comprising a body and raised numbers on said body.

5. The credit/debit card of claim 1, further comprising a physical contact interface for transmitting the one-time password.

6. The credit/debit card of claim 1 further including a body having the approximate size and shape of the credit/debit card.

7. The credit/debit card of claim 1, wherein the authentication device comprises a magnetic stripe.

8. The credit/debit card of claim 7, wherein the coded magnetic stripe comprises financial account information needed to perform credit or debit transactions.

9. The credit/debit card of claim 1, wherein the authentication device comprises a signature block.

10. The credit/debit card of claim 1, wherein the authentication device comprises a smart card processor.

11. The credit/debit card of claim 1, wherein the authentication device comprises a card number.

12. The credit/debit card of claim 1 where the one-time password generator comprises a special purpose integrated circuit chip.

13. The credit/debit card of claim 1 where the one-time password generator comprises a microprocessor chip.

14. The credit/debit card of claim 1 wherein the one-time password generator generates the one-time password using a time/clock-based algorithm.

15. A method for generating a one-time password using a credit/debit card, the method comprising:
receiving, by the credit/debit card, a challenge response inputted into the credit/debit card by a user of the credit/debit card, wherein the credit/debit card comprises one or more input devices configured to enable the user to input the challenge response, wherein the one or more input devices comprises a plurality of buttons corresponding to a plurality of characters, wherein a challenge response comprises a plurality of characters, and wherein a challenge response may be input into the credit/debit card using the plurality of buttons, one or more output devices, and a one-time password generator;
determining whether an input challenge response is successful
generating, by the one-time password generator, a one-time password based at least partially on a challenge response input by a user; and
outputting, by the one or more output devices comprising a display, the one-time password to the user via the display.

16. The method of claim 15 where the one-time password generator comprises a special purpose integrated circuit chip.

17. The method of claim 15 where the one-time password generator comprises a microprocessor chip.

18. The method of claim 15 where the one-time password is generated using a HOTP algorithm.

19. The method of claim 15 where the one-time password is generated using a time/clock-based algorithm.

20. The method of claim 15 wherein the outputting the one-time password comprises outputting, by the one or more output devices, one or more audio signals representing the one-time password.

21. The method of claim 15, wherein the credit/debit card comprises a coded magnetic stripe on the credit/debit card that enables the credit/debit card to be used as a payment device.

22. The method of claim 15, further comprising using a processor on the card for storing and transmitting information.

23. The credit/debit card of claim 15 wherein the one-time password identifies a credit/debit account associated with the credit/debit card.

24. An apparatus comprising:
a challenge module for presenting a challenge to a user, said challenge module comprising a plurality of buttons corresponding to a plurality of characters, wherein a challenge response comprises a plurality of characters, and wherein a challenge response may be input into the credit/debit card using the plurality of buttons;
memory for receiving a challenge response inputted into the apparatus in response to the challenge being presented to the user;
a processor in communication with the one or more input devices, wherein said processor is configured to determine whether an input challenge response is verified;
a generator for generating a one-time password based at least partially on the challenge response input by the user;
a device for presenting the one-time password; and
an authentication device allowing the apparatus to be used for performing transactions.

25. The apparatus of claim 24 wherein the authentication device comprises at least one of:
a coded magnetic stripe having a financial account identifier encoded therein; or
digits displaying the identifier.

26. The apparatus of claim 24 wherein the apparatus comprises a credit/debit card associated with a credit/debit account.

27. The credit/debit card of claim 1, wherein the challenge is presented to the user by displaying the challenge to the user via the display.

28. The credit/debit card of claim 1, wherein the display is configured to display a challenge to the user, and wherein the user inputs the successful challenge response in response to the challenge being displayed.

29. The credit/debit card of claim 28, wherein the successful challenge response is different than the challenge.

30. The method of claim 15, further comprising:
presenting, by the one or more output devices, a challenge to the user, wherein the presenting the challenge occurs before the receiving the challenge response.

31. The method of claim 30, wherein the challenge is different than the challenge response.

32. The method of claim 15, wherein the challenge response comprises two or more inputs.

* * * * *